July 16, 1935.　　　　　A. PULZ　　　　　2,008,516

SELF CONTAINED BASE RANGEFINDER

Filed June 23, 1934

Inventor:
Artur Pulz

Patented July 16, 1935

2,008,516

UNITED STATES PATENT OFFICE 2,008,516

SELF-CONTAINED BASE RANGEFINDER

Artur Pulz, Jena, Germany, assignor to the firm of Carl Zeiss, Jena, Germany

Application June 23, 1934, Serial No. 732,070
In Germany June 27, 1933

1 Claim. (Cl. 88—2.7)

As is well known, the usual self-contained base range-finders having two objectives and at least one eye-piece contain a device for combining the two images obtained, this device being in coincidence rangefinders a reflecting system combining and deviating the imaging rays and in stereoscopical rangefinders two mark plates which are disposed in the image planes of the eye-pieces and have deviating reflectors in front of them. Accordingly, the imaging rays traversing the objectives are deviated in all rangefinders of this kind by means of a reflecting system and at approximately right angles from the directions of the optical axes of the objectives. To obtain correct measuring results with these rangefinders, it is necessary to fulfill with the greatest possible approximation the condition that the device for combining the images permanently remains in that position with respect to the line interconnecting the rear principal points of the objectives and relatively to the plane at right angles to this line which it assumed when the adjustment of the rangefinder was effected. In practice, this condition is not, however, arrived at forthwith, because the rangefinders are to suffer unilateral exposure to the heat of the sun, which entails a bending of the exterior housing and, consequently, displacements of the parts connected to this exterior housing. With a view to avoiding this disadvantage, the objectives and the image-combining system are generally not connected to the exterior housing of the rangefinder direct but placed in a special interior housing so provided in the exterior housing that it may not be influenced by any bending of this exterior housing. Although representing an improvement, this method may not overcome the said disadvantage completely, since a unilateral exposure of the exterior housing to the heat of the sun will entail a unilateral exposure and a consequent bending of the interior housing, though the bending of the interior housing will not be as strong.

The invention, which aims at further decreasing the measuring errors due to the said influences, departs from the usual practice by substituting in rangefinders teleobjectives for the telescope objectives. The invention may naturally be used to advantage also when all optical parts are disposed in one housing.

Figure 1:
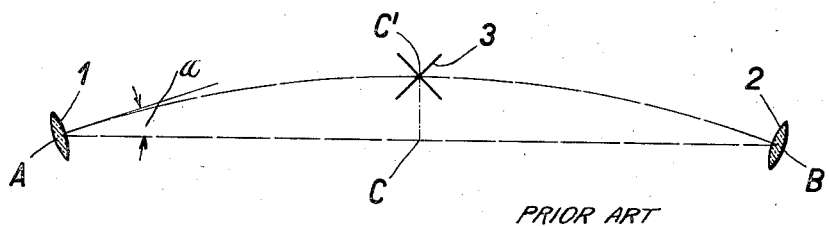
Figure 2:
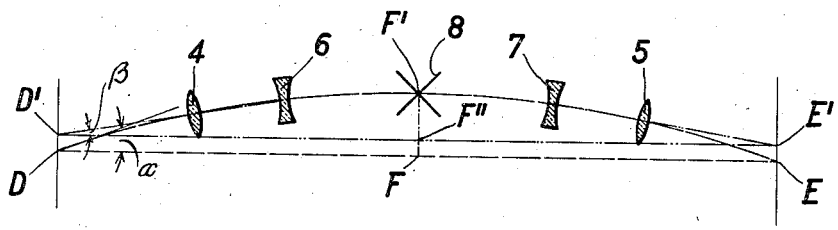
Figure 3:
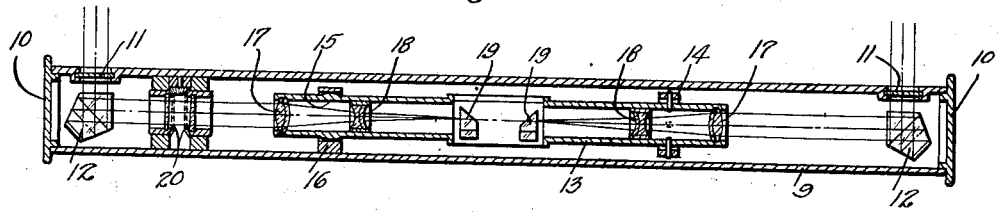

Figures 1 and 2 of the accompanying drawing represent schematically the effect of the bending in a coincidence rangefinder with telescope objectives and in a coincidence rangefinder with teleobjectives, respectively, the objectives of the two rangefinders having equal focal lengths. The advantage obtained by means of the teleobjectives may be readily seen when comparing the two figures. Figure 3 represents in central section a constructional example of a stereoscopic rangefinder according to the invention.

To explain the effect of the invention, it is sufficient to represent in the drawing the objectives and the image-combining system of the rangefinder. In Figure 1, the objectives are usual telescope objectives 1 and 2, whose rear principal points may be assumed in the present case to coincide with sufficient exactness with the centres A and B of the lenses 1 and 2, respectively. The image combining system is indicated by means of two plane reflectors 3 which cross each other. The crossing point C of these reflectors lies approximately in the focal planes of the objectives 1 and 2 and, when the axis of the rangefinder is straight, it bisects the line interconnecting the two principal points A and B. When the rangefinder is unilaterally exposed to the effect of the sun, this rangefinder is bent and the crossing point is displaced to C'. As is well known, the consequent angle of error $\alpha$ is approximately equal to twice the distance of the two positions of the crossing point C, divided by the objective focal length, viz: $\alpha$ is approximately equal to $$2\frac{CC'}{AC}.$$

The objectives of the rangefinder according to Figure 2 are teleobjectives consisting of a front converging member 4 or 5 and a rear diverging member 6 or 7. The rear principal points of these objectives, which lie before the objectives, are assumed to be the points D and E, respectively, which is in accordance with Figure 1. Assuming that the focal lengths of these objectives correspond to those of the objectives 1 and 2, the objective focal planes bisect approximately the line interconnecting the points D and E, and this at a point F, which, when the axis of the rangefinder is straight, coincides with the crossing point of the image combining system 8 indicated by two crossed reflectors. When the rangefinder is bent on account of exterior influences in the same manner as that according to Figure 1, the crossing point is displaced to the point F'. On account of the assumed coincidence of the measurements of the rangefinders according to Figures 1 and 2, $$FF'=CC'.$$

As the principal points of the objectives 4, 6 and 5, 7 lie in the line interconnecting the centres of the members of the objectives, the said points do not remain at D and E when the rangefinder is bent but are displaced to the points D' and E'. The point which bisects the line interconnecting the points D' and E' is F''. The angle of error $\beta$ arising in the rangefinder is approximately equal to $$2\frac{F''F'}{D'F''}.$$

However, as D' F'' is approximately equal to $$DF=AC,$$
$$FF'=CC'$$

and $$F''F'<FF',$$

the angle $$\beta<\alpha.$$

The constructional example of the invention (Figure 3) has an exterior tube 9 whose ends have covers 10. Near its ends, the exterior tube 9 has windows 11 behind which are disposed angular reflecting prisms 12. The pencils of imaging rays traversing the windows 11 are deviated by the prisms 12 in the direction of the rangefinder base. The exterior tube contains an interior tube 13 which rests in a cardan bearing 14 and has a spherical part 15 lying in a cylindrical bearing 16. The interior tube 13 has in each of its ends a teleobjective consisting of a front converging member 17 and a rear diverging member 18. In the middle of this tube 13 is disposed a system of two reflecting prisms 19 for deviating the pencils of imaging rays at an angle of approximately 90° to the eye-pieces (not represented in the drawing). The axes of these eye-pieces are assumed to be inclined relatively to the plane of the drawing. Between one of the angular reflecting prisms 12 and one of the members 17 is disposed a measuring device 20 consisting of a pair of rotating glass wedges.

The teleobjectives 17, 18 have such focal lengths that object points at a great distance are imaged in the ray exit surfaces of the prisms 19, which are to be provided with the stereoscopic measuring marks. The rangefinder is operated in quite the same manner as the usual rangefinders for binocular observation, for which reason a description of the operation is dispensed with. The errors of angle due to unilateral exposure to the effect of the sun and other influences are, however, reduced to the lowest possible degree by the known positions of the optical imaging parts 17, 18, 19 in a tube 13 disposed in, and being immune from the bending of, the exterior tube 9 and, as is explained in the description of Figure 2, by the teleobjectives 17, 18 substituted for the usual telescope objectives.

I claim:

In a self-contained base rangefinder containing two objectives and a reflecting system for deviating the imaging rays at approximately right angles from the direction of the optical axes of the objectives, the objectives being teleobjectives.

ARTUR PULZ.